(12) United States Patent
Ma et al.

(10) Patent No.: US 7,924,772 B2
(45) Date of Patent: Apr. 12, 2011

(54) METHOD AND APPARATUS TO SUPPORT MULTI-USER PACKETS IN A WIRELESS COMMUNICATION SYSTEM

(75) Inventors: Lin Ma, San Diego, CA (US); Zhigang Rong, San Diego, CA (US)

(73) Assignee: Nokia Corporation, Espoo (FI)

( * ) Notice: Subject to any disclaimer, the term of this patent is extended or adjusted under 35 U.S.C. 154(b) by 1192 days.

(21) Appl. No.: 11/124,130

(22) Filed: May 9, 2005

(65) Prior Publication Data
US 2006/0176881 A1 Aug. 10, 2006

Related U.S. Application Data

(60) Provisional application No. 60/651,198, filed on Feb. 10, 2005.

(51) Int. Cl.
*H04W 4/00* (2009.01)
*H04L 12/58* (2006.01)
(52) U.S. Cl. .................. 370/328; 370/392; 370/412
(58) Field of Classification Search .............. 709/231
See application file for complete search history.

(56) References Cited

U.S. PATENT DOCUMENTS

| | | | | |
|---|---|---|---|---|
| 6,484,145 B1 * | 11/2002 | Horne et al. | ....... | 705/8 |
| 2003/0072297 A1 * | 4/2003 | Oses et al. | ....... | 370/349 |
| 2004/0160984 A1 * | 8/2004 | Sidhushayana et al. | ....... | 370/474 |
| 2004/0190484 A1 * | 9/2004 | Shin et al. | ....... | 370/347 |
| 2004/0221053 A1 * | 11/2004 | Codella et al. | ....... | 709/231 |
| 2005/0018703 A1 * | 1/2005 | Blasco Claret et al. | ....... | 370/432 |
| 2005/0071882 A1 * | 3/2005 | Rodriguez et al. | ....... | 725/95 |
| 2005/0094675 A1 * | 5/2005 | Bhushan et al. | ....... | 370/527 |
| 2005/0281278 A1 * | 12/2005 | Black et al. | ....... | 370/412 |
| 2006/0164990 A1 * | 7/2006 | Bhushan et al. | ....... | 370/235 |
| 2006/0171356 A1 * | 8/2006 | Gurelli et al. | ....... | 370/329 |
| 2006/0268878 A1 * | 11/2006 | Jung et al. | ....... | 370/392 |
| 2007/0076678 A1 * | 4/2007 | Chen et al. | ....... | 370/342 |

FOREIGN PATENT DOCUMENTS

| WO | WO 00/72614 | 11/2000 |
|---|---|---|
| WO | WO 03/055142 | 7/2003 |

OTHER PUBLICATIONS

Search Report for PCT/IB2005/003826 dated Mar. 30, 2006.

* cited by examiner

*Primary Examiner* — Dang T Ton
*Assistant Examiner* — Ryan C Kavleski
(74) *Attorney, Agent, or Firm* — Alston & Bird LLP (57) ABSTRACT

Described is a method of constructing multi-user packets in a communication network utilizing packet-switching, wherein a plurality of user request service from the communication network. According to this method, priorities are allocated to each of the plurality of user. Of the plurality of user, those user are selected who indicate that multi-user packets are supportable. A group of user out of the selected user is formed, where group is defined in that all user who are member of the group allow at least one common transmission format. Finally, a multi-user packet is constructed utilizing one common transmission format.

21 Claims, 3 Drawing Sheets

METHOD AND APPARATUS TO SUPPORT MULTI-USER PACKETS IN A WIRELESS COMMUNICATION SYSTEM

REFERENCE TO RELATED APPLICATIONS

This application claims priority of U.S. Provisional Patent Application Ser. No. 60/651,198, filed Feb. 10, 2005. The subject matter of this earlier filed application is hereby incorporated by reference.

FIELD OF THE INVENTION

The present invention relates to a method, system and network element for constructing multi-user packets in a communication network.

BACKGROUND OF THE INVENTION

The International Mobile Telecommunications-2000 (IMT-2000) is the global standard for wireless communications of the third generation (3G), defined by a set of interdependent recommendations of the International Telecommunication Union (ITU). As one proposal towards this standard, there is CDMA2000 as the interim standard'95 (IS-95) successor. However, CDMA2000 (which is also known as "1x") does not meet the 2 Mbps data rates as required by IMT-2000.

Accordingly, a data optimized (DO) evolution (EV) of the CDMA2000 (1x) has been proposed, which is called 1xEV-DO.

Currently, there are two revisions available, which are named Rev-0 and Rev-A. In 1xEV-DO Rev-0, the access network transmits a signal to one access terminal at one time. In 1xEV-DO Rev-A, a multi-user packet transmission was introduced. The purpose thereof is to improve the packing efficiency by transmitting multiple packets to one or multiple users at one time. The standard 1xEV-DO Rev-A is described in document C25-20040527-001: "CDMA2000 High Rate Packet Data Air Interface Specification (TIA-856-A)" of the $3^{rd}$ Generation Partnership Project 2 (3GPP2).

However, it is presently not defined anywhere how to perform a multi-user packet operation for the 1xEV-DO system.

SUMMARY OF THE INVENTION

Therefore, it is an object of the present invention to provide an efficient way to perform multi-user packet operation, by proposing an efficient way to construct multi-user packets.

According to one aspect of the present invention, this object is solved by providing a method of constructing multi-user packets in a communication network utilizing packet-switching, wherein a plurality of user subscribe to the communication network, the method comprising: allocating priorities to each of the plurality of user; selecting those user of the plurality of user who indicate that resources allowing the support of multi-user packets are available; forming a group of user out of the selected user which group is defined in that all user who are member of the group allow at least one common transmission format; and constructing a multi-user packet utilizing one common transmission format.

Said step of constructing a multi-user packet may further include determining the entire data amount to be transmitted by the group of user by summing up the respective data amounts which the single members of the group of user have to be transmitted; selecting a common transmission format which fits closest to the entire data amount to be transmitted, wherein a common transmission format with the highest data rate is selected in case there is more than one common transmission format fitting closest to the entire data amount to be transmitted; and constructing a multi-user packet having the selected common transmission format and comprising a fraction of the entire data amount to be transmitted which fits the size of the selected common transmission format, wherein the fraction is composed by taking into account the respective data amounts which the single members of the group of user have to be transmitted only as a whole and in the order of the respective priority of the user corresponding to a respective data amount to be transmitted.

Said step of allocating priorities may take into account at least one of the group of a subscriber profile, a packet waiting time in a buffer, a requested data rate control channel value, and quality of service requirements.

According to another aspect of the present invention, this object is solved by providing a method of constructing multi-user packets in a communication network utilizing packet-switching, wherein a plurality of user subscribe to the communication network, the method comprising: calculating priorities for each user and creating a priority-table listing the users in the order of their priorities; selecting the first user in the priority-table who comprises a data rate control channel value which indicates a support of multi-user packets, and storing a multi-user media access control index and transmission formats related to said multi-user media access control index which can be supported by this user; selecting the next user in the priority-table who comprises a multi-user media access control index in common with the already selected user(s); selecting a multi-user media access control index with the highest data rate in case there are multiple multi-user MAC indexes in common; deciding whether a physical layer packet size according to one or more transmission formats related to the selected multi-user media access control index can accommodate a sum of all the selected users' payload and header bits, wherein a next user is selected if none is qualified, and a transmission format with the shortest packet size is selected if more than one transmission format within the selected multi-user media access control index is qualified; updating the stored multi-user media access control index and transmission format with the selected values; checking how many users have been selected and repeating the steps starting with the selecting the next user step, if the number of selected users is not yet equal to an upper limit and the end of the priority-table is not reached; and constructing a single user packet based on the comprised data rate control channel value, if only one user is selected, and constructing a multi-user packet based on the stored multi-user media access control index and transmission format, if more than one user is selected.

The step of calculating the priorities may take into account at least a subscriber profile, a packet waiting time in a buffer, a requested data rate control channel value, and quality of service requirements.

According to still another aspect of the present invention, this object is solved by providing a system for constructing multi-user packets in a communication network utilizing packet-switching, wherein a plurality of user subscribe to the communication network by using terminals, the system comprising network elements which are operably connected to as well as configured to allocate priorities to each of the plurality of user; select those user of the plurality of user who indicate that resources allowing the support of multi-user packets are available; form a group of user out of the selected user which group is defined in that all user who are member of the group allow at least one common transmission format; and construct a multi-user packet utilizing one common transmission format.

Said construction configuration may further include to determine the entire data amount to be transmitted by the group of user by summing up the respective data amounts which the single members of the group of user have to be transmitted; select a common transmission format which fits closest to the entire data amount to be transmitted, wherein a common transmission format with the highest data rate is selected in case there is more than one common transmission format fitting closest to the entire data amount to be transmitted; and construct a multi-user packet having the selected common transmission format and comprising a fraction of the entire data amount to be transmitted which fits the size of the selected common transmission format, wherein the fraction is composed by taking into account the respective data amounts which the single members of the group of user have to be transmitted only as a whole and in the order of the respective priority of the user corresponding to a respective data amount to be transmitted.

Said allocation configuration may further include to take into account at least one of the group of a subscriber profile, a packet waiting time in a buffer, a requested data rate control channel value, and quality of service requirements.

According to still another aspect of the present invention, this object is solved by providing a system for constructing multi-user packets in a communication network utilizing packet-switching, wherein a plurality of user subscribe to the communication network by using terminals, the system comprising network elements which are operably connected to as well as configured to calculate priorities for each user and create a priority-table listing the users in the order of their priorities; select the first user in the priority-table who comprises a data rate control channel value which indicates a support of multi-user packets, and store a multi-user media access control index and transmission formats related to said multi-user media access control index which can be supported by this user; select the next user in the priority-table who comprises a multi-user media access control index in common with the already selected user(s); select a multi-user media access control index with the highest data rate in case there are multiple multi-user MAC indexes in common; decide whether a physical layer packet size according to one or more transmission formats related to the selected multi-user media access control index can accommodate a sum of all the selected users' payload and header bits, wherein a next user is selected if none is qualified, and a transmission format with the shortest packet size is selected if more than one transmission format within the selected multi-user media access control index is qualified; update the stored multi-user media access control index and transmission format with the selected values; check how many users have been selected, and repeat the operations starting with the selection of the next user, if the number of selected users is not yet equal to an upper limit and the end of the priority-table is not reached; and construct a single user packet based on the comprised data rate control channel value, if only one user is selected, and construct a multi-user packet based on the stored multi-user media access control index and transmission format, if more than one user is selected.

Said allocation configuration may further include to take into account at least a subscriber profile, a packet waiting time in a buffer, a requested data rate control channel value, and quality of service requirements.

According to still another aspect of the present invention, this object is solved by providing a network element configured to construct multi-user packets in a communication network utilizing packet-switching, wherein a plurality of user subscribe to the communication network by using terminals, the network element being configured to allocate priorities to each of the plurality of user; select those user of the plurality of user who indicate that resources allowing the support of multi-user packets are available; form a group of user out of the selected user which group is defined in that all user who are member of the group allow at least one common transmission format; and construct a multi-user packet utilizing one common transmission format.

Said construction configuration may further include to determine the entire data amount to be transmitted by the group of user by summing up the respective data amounts which the single members of the group of user have to be transmitted; select a common transmission format which fits closest to the entire data amount to be transmitted, wherein a common transmission format with the highest data rate is selected in case there is more than one common transmission format fitting closest to the entire data amount to be transmitted; and construct a multi-user packet having the selected common transmission format and comprising a fraction of the entire data amount to be transmitted which fits the size of the selected common transmission format, wherein the fraction is composed by taking into account the respective data amounts which the single members of the group of user have to be transmitted only as a whole and in the order of the respective priority of the user corresponding to a respective data amount to be transmitted.

Said allocation configuration may further include to take into account at least one of the group of a subscriber profile, a packet waiting time in a buffer, a requested data rate control channel value, and quality of service requirements.

According to still another aspect of the present invention, this object is solved by providing a network element configured to construct multi-user packets in a communication network utilizing packet-switching, wherein a plurality of user subscribe to the communication network by using terminals, the network element being configured to calculate priorities for each user and create a priority-table listing the users in the order of their priorities; select the first user in the priority-table who comprises a data rate control channel value which indicates a support of multi-user packets, and store a multi-user media access control index and transmission formats related to said multi-user media access control index which can be supported by this user; select the next user in the priority-table who comprises a multi-user media access control index in common with the already selected user(s); select a multi-user media access control index with the highest data rate in case there are multiple multi-user MAC indexes in common; decide whether a physical layer packet size according to one or more transmission formats related to the selected multi-user media access control index can accommodate a sum of all the selected users' payload and header bits, wherein a next user is selected if none is qualified, and a transmission format with the shortest packet size is selected if more than one transmission format within the selected multi-user media access control index is qualified; update the stored multi-user media access control index and transmission format with the selected values; check how many users have been selected, and repeat the operations starting with the selection of the next user, if the number of selected users is not yet equal to an upper limit and the end of the priority-table is not reached; and construct a single user packet based on the comprised data rate control channel value, if only one user is selected, and construct a multi-user packet based on the stored multi-user media access control index and transmission format, if more than one user is selected.

Said allocation configuration may further include to take into account at least a subscriber profile, a packet waiting time in a buffer, a requested data rate control channel value, and quality of service requirements.

It is to be noted that the present invention is particularly applicable to the 1xEV-DO system, but not limited thereto.

BRIEF DESCRIPTION OF THE DRAWINGS

Further details and advantages of the present invention are apparent from the following description of the preferred embodiments thereof which are to be taken in conjunction with the accompanying drawings, in which.

DETAILED DESCRIPTION OF THE PREFERRED EMBODIMENTS

As described above, the multi-user packet transmission was introduced in standard 1xEV-DO Rev-A. In a 1xEV-DO forward link, the access network (AN) performs data scheduling at every slot interval. In Rev-0 of 1xEV-DO, the access network schedules the transmission format based on the data rate control channel (DRC) report from the access terminal (AT). The access network uses the user-specific media access control (MAC) index to indicate to which user the scheduled packet is intended to. In Rev-A, one DRC value that the access terminal reports may match to multiple formats. For example, DRC 3 can be interpreted as four different formats, (128, 4, 256), (256, 4, 256), (512, 4, 256) and (1024, 4, 256), where the notation in parentheses represents (<packet length (bits)>, <number of slots>, <preamble length>) and uniquely specifies a particular transmission format. It is up to the access network to decide which format is to be used. The access network uses the MAC index that is dedicated to the multi-user packets to indicate to the access terminal that this is a multi-user packet. Upon receiving a multi-user MAC index, the access terminal looks for the field that contains its packet length, and then reads out the data correspondingly.

According to a preferred embodiment of the present invention, an efficient algorithm is proposed for the access network to construct multi-user packets. More specifically, the access network will determine whether the multi-user packets should be used at the current scheduling period (the decision can be based, for example, on the DRC values of the requested user and the data bits in the buffer);

if multi-user packets are to be used, which MAC index and what transmission format should be used;

how many users' data should be packed into a multi-user packet (at any scheduling period, there might be multiple users waiting to be served; in Rev-A of 1xEV-DO, the maximum number of users that can be carried in a single multi-user packet is eight, however, the algorithm described according to a preferred embodiment of the present invention can be extended to any number);

which users' packets should be packed together.

Based on the Rev-A standard of 1xEV-DO (see document C25-20040527-001: "CDMA2000 High Rate Packet Data Air Interface Specification (TIA-856-A)" of the $3^{rd}$ Generation Partnership Project 2), the multi-user MAC index and the transmission format that each DRC can support can be summarized as shown in Table 1. From the table it is apparent that DRC values of 0, 1 and 2, respectively, cannot support a multi-user packet transmission.

TABLE 1 multi-user MAC index and DRC values

| Multi-user MAC index | transmission format | DRC Value | | | | | | | | | | | | | |
|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 |
| 66 | (128, 4, 256) (256, 4, 256) (512, 4, 256) (1024, 4, 256) | | | | X | X | X | X | X | X | X | X | X | X | X | X |
| 67 | (2048, 4, 128) | | | | | | X | | X | X | X | X | X | X | X | X |
| 68 | (3072, 2, 64) | | | | | | | | | X | | X | X | X | X | X |
| 69 | (4096, 2, 64) | | | | | | | | | | | X | | X | X | X |
| 70 | (5120, 2, 64) | | | | | | | | | | | | | | X | X |

Figure 1:
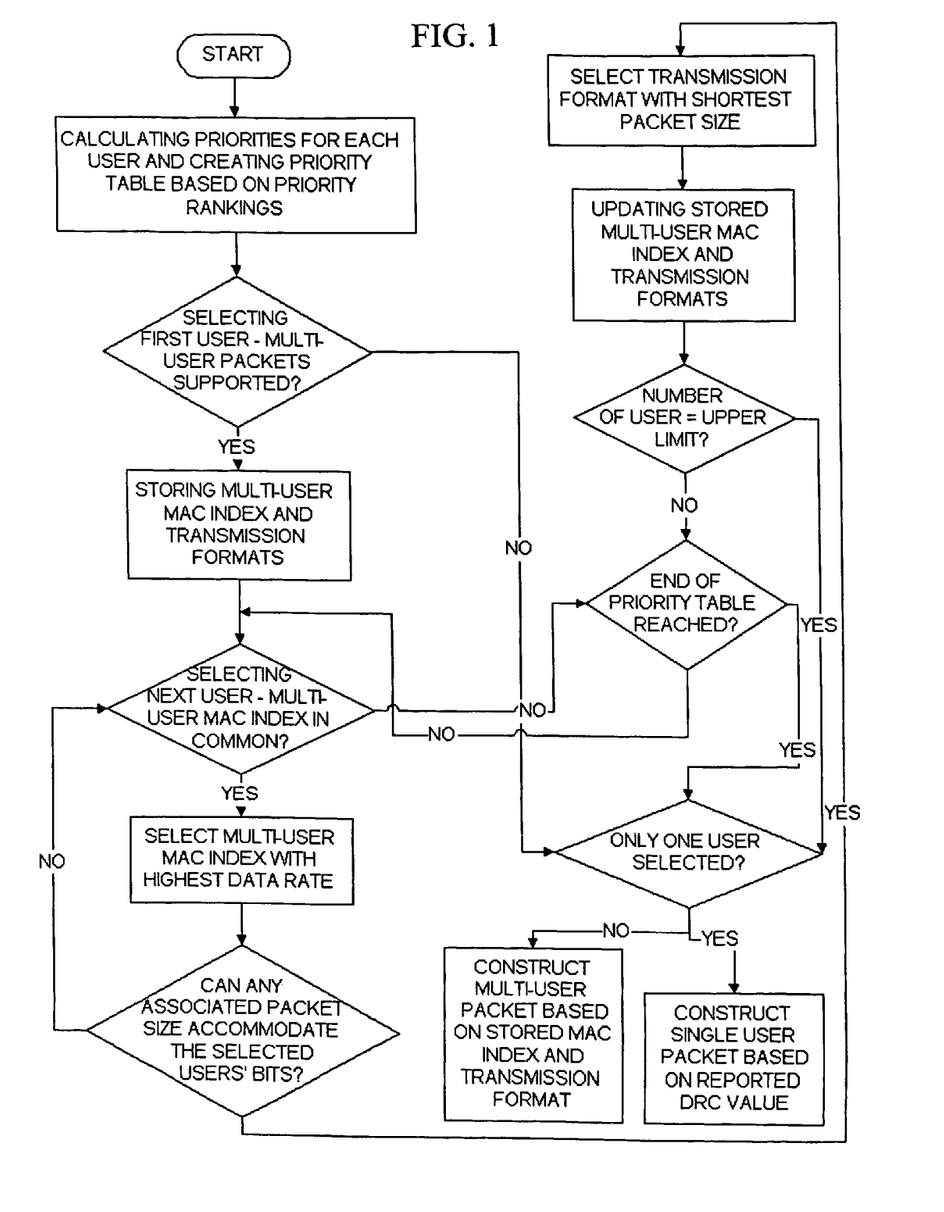
FIG. 1 shows a flow chart illustrating the method according to a preferred embodiment of the present invention.

According to a preferred embodiment of the present invention shown in FIG. 1, an implementation can be as follows:

1) The access network calculates the priorities for each requested user and creates a priority-table based on the priority rankings. The priority calculation can take into account many factors such as the subscriber profile, the packet waiting time in buffer, the requested DRC value, and Quality of Service (QoS) requirement, etc.

2) The access network selects the first user in the priority-table (i.e. with the highest priority) and checks whether the DRC value of this user indicates a support of multi-user packets. If not, the algorithm proceeds with step 5). Otherwise, the access network stores the multi-user MAC index and the transmission formats which can be supported by this user. Depending on the DRC value, one user may support multiple transmission formats. (For example, a user with a DRC value of 14 can support all the formats presented in Table 1.)

3) The access network selects the next user in the priority-table and checks if there is any multi-user MAC index in common between those which can be supported by this user and those which can be supported by the already-selected user(s). If there is no common ground at all, this user is skipped and the present step (step 3) is repeated with the next user of the priority table, while step 5 is executed instead, if the end of priority-table is reached. Otherwise, the algorithm continues with step 4).

4) If there are multiple multi-user MAC indexes in common, the one with the highest data rate should be selected. Then the access network decides whether at least one of the physical layer packet sizes associated with the just-selected multi-user MAC index can accommodate the sum of all the selected users' payload and header bits. If none is qualified, the algorithm jumps to step 3) again. (It is to be noted that multi-user MAC index 66 corresponds to several transmission formats. Therefore, all the formats for that MAC index should be checked to see if they can accommodate the sum of all the selected users' payload and header bits.) If more than one format within that MAC index is qualified, the one with the shortest packet size is selected. (The purpose is to increase the packing efficiency as well as to achieve a higher reliability.) The access network updates the stored multi-user MAC index and transmission format with the selected values. Now the access network checks how many users have been selected. If the number of selected users equals to the upper limit of the number of users that a multi-user packet can support or the end of the priority-table is reached, the algorithm continues with step 5). Otherwise, step 3) is repeated.

5) If only one user is selected, the access network constructs a single user packet based on the reported DRC value. If more than one user is selected, the access network constructs a multi-user packet based on the stored MAC index and transmission format.

EXAMPLE 1

In the following, example 1 is described to further illustrate the method according to a preferred embodiment of the present invention described above and shown in FIG. 1. It is assumed that there are six users waiting to be served at a time t. A priority-table is created and shown in Table 2. The reported DRC values and their buffer status are also included in the table. It is to be noted that for illustration purposes, the overheads for the MAC Layer and the Physical Layer are not taken into account in the following description.

TABLE 2

DRC values and Data Bits in Buffer

| User Index | DRC Value | Data Bits in Buffer |
|---|---|---|
| 1 | 12 | 100 |
| 2 | 8 | 200 |
| 3 | 1 | 300 |
| 4 | 4 | 100 |
| 5 | 7 | 600 |
| 6 | 3 | 500 |

The access network first takes a look at what multi-user MAC index a first user (User Index 1) can support. From Table 1 it can be seen that with a DRC value 12, User 1 can support a multi-user MAC index 66 up to 69. The access network stores these MAC indices together with their corresponding transmission formats.

The access network then starts to look at User 2. With a DRC value of 8, User 2 can support a multi-user MAC index 66 up to 68. The common MAC indices that both users can support are 66, 67 and 68. Among the common MAC indices 68 is selected, because it provides the highest data rate. Since the sum of the data bits in buffer for the two users is 100+200=300 bits, it can be well accommodated in a physical layer packet size of 3072 bits that MAC index 68 matches to. Therefore User 2 is selected to be included in the multi-user packet in addition to User 1. The access network replaces the stored MAC indices and transmission formats with MAC index 68 and its corresponding transmission format.

The access network continues on the priority-table for User 3. Since a DRC value 1 indicates that there is no support for multi-user packets, this user is skipped and the access network checks User 4 at the next stage. User 4 requests a DRC value 4, which indicates support for multi-user MAC index 66. Now the common multi-user MAC index that Users 1, 2 and 4 can all support is 66. There are four different transmission formats associated with MAC index 66. Since the sum of the data bits in buffer for the three users is 100+200+100=400 bits, the closest physical layer packet size that they can fit in is 512 bits. Therefore User 4 is selected, and the MAC index 66 and format (512, 4, 256) are stored in the access network for the multi-user packet transmission.

The access network moves on to check User 5. By adding User 5, now the common multi-user MAC index is 66, and the sum of data bits of the already-selected users and User 5 is 100+200+100+600=1000 bits, which can fit in a physical layer packet size of 1024 bits. Therefore User 5 is selected, and the transmission format is updated with (1024, 4, 256) and stored in the access network.

Next, the access network checks User 6 in the priority-table. The common multi-user MAC index by taking into account this user is 66, and the sum of the data bits of the already-selected users and User 6 is 1000+500=1500 bits, which exceeds the maximum physical layer packet size of 1024 bits associated with MAC index 66, therefore User 6 will not be included in the multi-user packet.

In summary, the access network constructs the multi-user packets with the data bits from Users 1, 2, 4 and 5. The multi-user MAC index will be 66 and the transmission format will be (1024, 4, 256).

EXAMPLE 2

Figure 2:
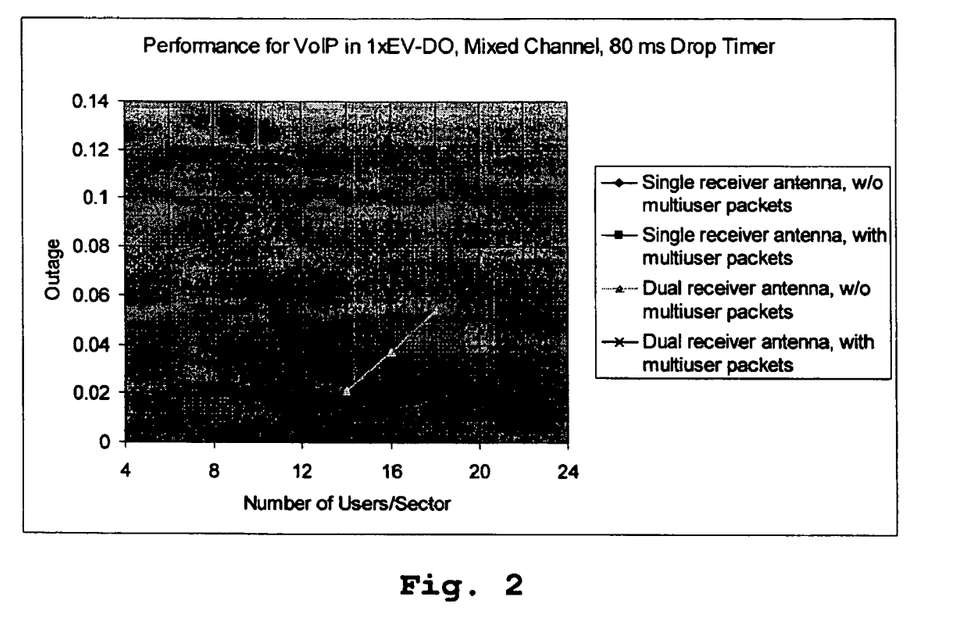
FIG. 2 shows the performance gain provided by a method according to Example 2 of a preferred embodiment of the present invention, using a mixed channel condition.
Figure 3:
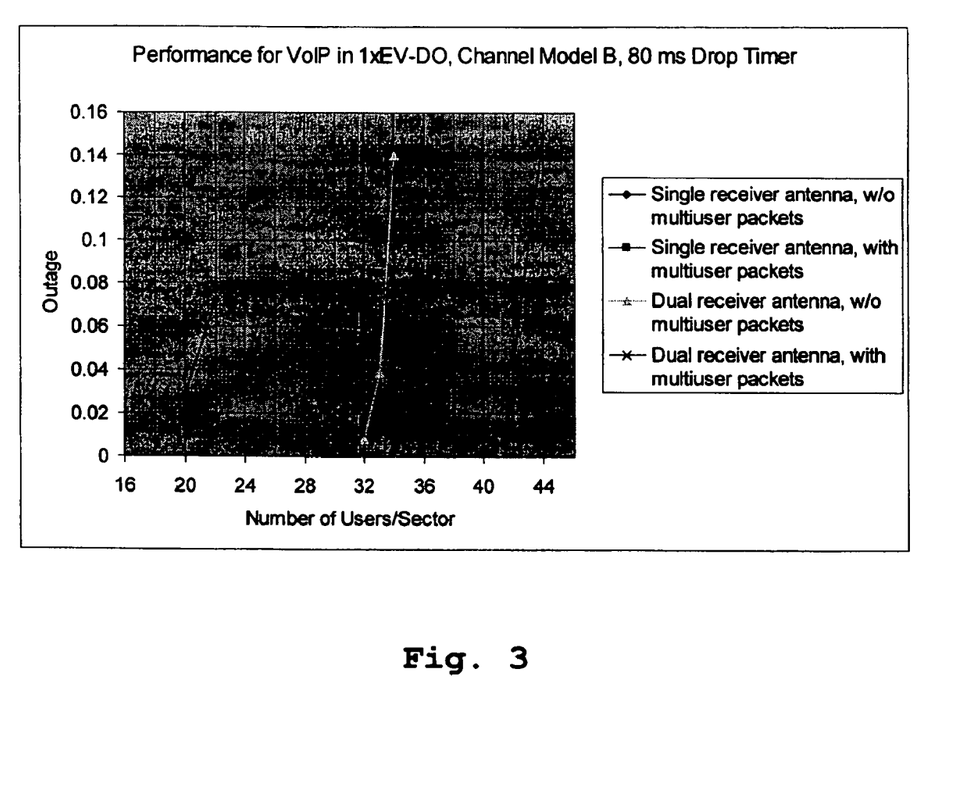
FIG. 3 shows the performance gain provided by a method according to Example 2 of a preferred embodiment of the present invention, using channel model B, which represents a 3-path channel model.

The method according to a preferred embodiment of the present invention has been implemented in a system level simulation for 1xEV-DO Rev-A. The simulation follows the methodology described in document C30-20031002-004: "1xEV-DO Evaluation Methodology" of the 3$^{rd}$ Generation Partnership Project 2 (3GPP2). The simulation results for Voice over Internet Protocol (VoIP) traffic in mixed channels and channel model B are provided in FIGS. 2 and 3, respectively. The multi-path profile for mixed channel and channel model B can be found in document C30-20031002-004: "1xEV-DO Evaluation Methodology" of the 3$^{rd}$ Generation Partnership Project 2 (3GPP2). From FIG. 2 it is apparent that with a number of users per sector of 12, for the single receiver antenna case the outage level with and without the method according to a preferred embodiment of the present invention are 0.098 and 0.115, respectively. On the other hand, for the dual receiver antenna case, the outage levels are 0.022 and 0.054 with 18 users per sector. According to document C30-20031002-004: "1xEV-DO Evaluation Methodology" of the 3$^{rd}$ Generation Partnership Project 2 (3GPP2), the outage level for the system capacity is capped at 0.03. In this case, the capacity with and without using the method according to a preferred embodiment of the present invention are 19 and 15 users per sector, which provides a gain of 27%. The gain becomes larger when the received signal has better quality, because more users can be packed into a multi-user packet, and therefore, the packing efficiency is improved. The same trend can also be observed in FIG. 3, while the capacity gain for the single antenna case is 15% and 28% for dual receiver antenna case.

The advantage of the method according to a preferred embodiment of the present invention is that it can achieve a high packing efficiency and that it is simple to implement.

Preferred embodiments of the present invention apply to the access network scheduling of multi-user packets in standard 1xEV-DO Rev-A, i.e. these preferred embodiments are mainly targeted at the implementation of multi-user packets operation in standard 1xEV-DO Rev-A. Accordingly, since the method according to these preferred embodiments of the present invention can increase the packing efficiency as well as achieve high reliability, any network operating adopting 1xEV-DO Rev-A can benefit from the use of the present invention.

However, as stated above, the present invention is not limited to 1xEV-DO Rev-A. Rather, it is to be noted that it should be clear to those with skill in the art that various modifications and equivalent arrangements may be made without departing from the present invention in its broader aspects. It is therefore the intention that all those modifications and equivalent arrangements are covered by the spirit and scope of the appended claims.

Accordingly, described above is a method of constructing multi-user packets in a communication network utilizing packet-switching, wherein a plurality of user subscribe to the communication network, the method comprising: allocating priorities to each of the plurality of user; selecting those user of the plurality of user who indicate that resources allowing the support of multi-user packets are available; forming a group of user out of the selected user which group is defined in that all user who are member of the group allow at least one common transmission format; and constructing a multi-user packet utilizing one common transmission format.

The invention claimed is:

1. A method comprising:

allocating, at a processor, priorities to each of a plurality of users by taking into account at least one of a subscriber profile and a requested data rate control channel value;

selecting at the processor a highest priority user from the plurality of users;

determining whether the highest priority user supports multi-user packets;

in response to determining that the highest priority user supports multi-user packets:

forming, at the processor, a group of users with the selected highest priority user, wherein each member of the group of users allows at least one common transmission format and a physical layer packet size associated with the at least one common transmission format accommodates a sum of payload and header bits of the group of users, and constructing, at the processor, a multi-user packet utilizing one common transmission format; and in response to determining that the highest priority user does not support multi-user packets constructing a single-user packet for the highest priority user.

2. The method according to claim 1, wherein the constructing the multi-user packet further comprises:

determining at the processor an entire data amount to be transmitted by the group of users by summing up respective data amounts that each member of the group of users is to transmit;

selecting at the processor a common transmission format which fits closest to the entire data amount to be transmitted, wherein a common transmission format with a highest data rate is selected when there is more than one common transmission format fitting closest to the entire data amount to be transmitted; and constructing at the processor the multi-user packet having the selected common transmission format and comprising a fraction of the entire data amount to be transmitted that fits a size of the selected common transmission format, wherein the fraction takes into account the respective data amounts which each member of the group of users is to transmit only as a whole and in an order of respective priority of the user corresponding to the respective data amount to be transmitted.

3. The method according to claim 1, wherein said wherein said allocating of the priorities further takes into account at least one of a packet waiting time in a buffer and quality of service requirements.

4. A method comprising:

calculating at a processor priorities for each user and creating a priority-table listing users in an order of corresponding priorities;

selecting at the processor a first user in the priority-table comprising a data rate control channel value that indicates a support of multi-user packets;

directing storing by the processor of a multi-user media access control index and transmission formats related to said multi-user media access control index which is supported by the selected first user;

selecting at the processor a next user in the priority-table comprising the multi-user media access control index in common with the multi-user media access control index of the selected first user;

selecting at the processor the multi-user media access control index with a highest data rate when multiple multi-user media access control indexes are in common;

deciding at the processor whether a physical layer packet size, according to one or more of the transmission formats related to the selected multi-user media access control index, accommodates a sum of all payloads and header bits of all of the selected users, wherein selection of a next user from the priority table is performed to add to the selected users when no packet size associated with the related transmission formats accommodates the sum of all of the payloads and the header bits of all of the selected users, and a transmission format with a shortest packet size is selected if more than one of the transmission formats within the selected multi-user media access control index is qualified;

updating by the processor the stored multi-user media access control index and transmission format with the selected multi-user media access control index and transmission format;

checking at the processor a number of users selected, wherein when the number of the selected users is less than an upper limit and an end of the priority-table is not reached; and repeating at the processor the selecting of the next user, the selecting of the multi-user media access control index, the deciding, the updating, and the checking; and constructing at the processor a single user packet based on the data rate control channel value, if only one user is selected, and constructing the multi-user packet based on the stored multi-user media access control index and transmission format, if more than one user is selected.

5. The method according to claim 4, wherein the calculating of the priorities takes into account at least a subscriber profile, a packet waiting time in a buffer, a requested data rate control channel value, and quality of service requirements.

6. A system, comprising:
a network element configured to:
  allocate priorities to each of a plurality of users by taking into account at least one of a subscriber profile and a requested data rate control channel value;
  select a highest priority user from the plurality of users; determine whether the highest priority user supports multi-user packets; wherein the network element is further configured to, in response to determining that the highest priority user supports multi-user packets, form a group of users with the selected highest priority user, wherein each member of the group allows at least one common transmission format and a physical layer packet size associated with the at least one common transmission format accommodates a sum of payload and header bits of the group of users, and construct a multi-user packet utilizing one common transmission format; and
  wherein the network element is further configured to, in response to determining that the highest priority user does not support multi-user packets, construct a single-user packet for the highest priority user.

7. The system according to claim 6, wherein said network element configured to construct said multi-user packet is further configured to
  determine an entire data amount to be transmitted by the group of users by summing up respective data amounts that each member of the group of users is to transmit;
  select a common transmission format which fits closest to the entire data amount to be transmitted, wherein a common transmission format with a highest data rate is selected when there is more than one common transmission format fitting closest to the entire data amount to be transmitted; and
  construct the multi-user packet having the selected common transmission format and comprising a fraction of the entire data amount to be transmitted that fits a size of the selected common transmission format, wherein the fraction takes into account the respective data amounts which each member of the group of users is to transmit only as a whole and in an order of respective priority of the user corresponding to the respective data amount to be transmitted.

8. The system according to claim 6, wherein said allocation of the priorities further comprises taking into account at least one of a packet waiting time in a buffer and quality of service requirements.

9. A system comprising:
a network element configured to calculate priorities for each of a plurality of users and creating a priority-table listing the users in an order of corresponding priorities;
  select a first user in the priority-table comprising a data rate control channel value that indicates a support of multi-user packets;
  cause storing of a multi-user media access control index and transmission formats related to said multi-user media access control index which is supported by the selected first user;
  select a next user in the priority-table comprising the multi-user media access control index in common with the multi-user media access control index of the selected first user;
  select the multi-user media access control index with a highest data rate when multiple multi-user media access control indexes are in common;
  decide whether a physical layer packet size, according to one or more transmission formats related to the selected multi-user media access control index, accommodates a sum of all payloads and header bits of all of the selected users, wherein the network element is configured to select the next user from the priority-table to add to the selected users when no packet size associated with the related transmission formats accommodates the sum of all of the payloads and the header bits of all of the selected users, and a transmission format with a shortest packet size is selected if more than one of the transmission formats within the selected multi-user media access control index is qualified;
  update the stored multi-user media access control index and transmission format with the selected multi-user media access control index and transmission format;
  check a number of users selected, wherein when the number of the selected users is less than an upper limit and an end of the priority-table is not reached, repeating the selecting of a next user, the selecting of the multi-user media access control index, the deciding, the updating, and the checking; and
  construct a single user packet based on the data rate control channel value, if only one user is selected, and construct the multi-user packet based on the stored multi-user media access control index and transmission format, if more than one user is selected.

10. The system according to claim 9, wherein said network element configured to calculate the priorities is further configured to take into account at least a subscriber profile, a packet waiting time in a buffer, a requested data rate control channel value, and quality of service requirements.

11. An apparatus comprising:
a processor configured to:
  allocate priorities to each of a plurality of users by taking into account at least one of a subscriber profile and a requested data rate control channel value;
  select a highest priority user from the plurality of users;
  determine whether the highest priority user supports multi-user packets;
  in response to determining that the highest priority user supports multi-user packets:
    form a group of users with the selected highest priority user, wherein each member of the group of users allows at least one common transmission format and a physical layer packet size associated with the at least one common transmission format accommodates a sum of payload and header bits of the group of users, and
    construct a multi-user packet utilizing one common transmission format; and
  in response to determining that the highest priority user does not support multi-user packets construct a single-user packet for the highest priority user when the highest priority user does not support multi-user packets.

12. The apparatus according to claim 11, wherein said processor configured to construct said multi-user packet is further configured to determine an entire data amount to be transmitted by the group of users by summing up respective data amounts that each member of the group of users is to transmit;

select a common transmission format which fits closest to the entire data amount to be transmitted, wherein a common transmission format with a highest data rate is selected when there is more than one common transmission format fitting closest to the entire data amount to be transmitted; and construct the multi-user packet having the selected common transmission format and comprising a fraction of the entire data amount to be transmitted that fits a size of the selected common transmission format, wherein the fraction takes into account the respective data amounts which each member of the group of users is to transmit only as a whole and in an order of respective priority of the user corresponding to the respective data amount to be transmitted.

13. The apparatus according to claim 11, wherein said allocation of said priorities further comprises taking into account at least one of a packet waiting time in a buffer and quality of service requirements.

14. An apparatus, comprising:
a processor configured to calculate priorities for each of a plurality of users and creating a priority-table listing users in an order of corresponding priorities;
select a first user in the priority-table comprising a data rate control channel value that indicates a support of multi-user packets;
direct storing of a multi-user media access control index and transmission formats related to said multi-user media access control index which is supported by the selected first user;
select a next user in the priority-table comprising the multi-user media access control index in common with the multi-user media access control index of the selected first user;
select the multi-user media access control index with a highest data rate when multiple multi-user media access control indexes are in common;
decide whether a physical layer packet size, according to one or more of the transmission formats related to the selected multi-user media access control index, accommodate a sum of all payloads and header bits of all of the selected users, wherein the processor is configured to select the next user from the priority-table to add to the selected users when no packet size associated with the related transmission formats accommodates the sum of all of the payloads and the header bits of all of the selected users, and select a transmission format with a shortest packet size if more than one of the transmission formats within the selected multi-user media access control index is qualified;
update the stored multi-user media access control index and transmission format with the selected multi-user media access control index and transmission format;
check a number of users selected, wherein when the number of the selected users is less than an upper limit and an end of the priority-table is not reached, the processor is further configured to repeat the selecting of the next user, the selecting of the multi-user media access control index, the deciding, the updating, and the checking; and
construct a single user packet based on the data rate control channel value, if only one user is selected, and construct the multi-user packet based on the stored multi-user media access control index and transmission format, if more than one user is selected.

15. The apparatus according to claim 14, wherein said processor configured to calculate the priorities is further configured to take into account at least a subscriber profile, a packet waiting time in a buffer, a requested data rate control channel value, and quality of service requirements.

16. A system, comprising:
allocating means for allocating priorities to each of a plurality of users by taking into account at least one of a subscriber profile and a requested data rate control channel value;
selecting means for selecting a highest priority user from the plurality of users;
determining means for determining whether the highest priority user supports multi-user packets;
forming means for forming a group of users with the selected highest priority user, in response to determining that the highest priority user supports multi-user packets, wherein each member of the group of users allows at least one common transmission format and a physical layer packet size associated with the at least one common transmission format accommodates a sum of payload and header bits of the group of users;
constructing means for constructing a multi-user packet utilizing one common transmission format, in response to determining that the highest priority user supports multi-user packets; and
constructing means for constructing a single-user packet for the highest priority user in response to determining that the highest priority user does not support multi-user packets.

17. An apparatus, comprising:
allocating means for allocating priorities to each of a plurality of users by taking into account at least one of a subscriber profile and a requested data rate control channel value;
selecting means for selecting a highest priority user from the plurality of users indicating available resources allowing support of multi-user packets;
determining means for determining whether the highest priority user supports multi-user packets;
forming means for forming a group of users with the selected highest priority user, in response to determining that the highest priority user supports multi-user packets, wherein each member of the group of users allows at least one common transmission format and a physical layer packet size associated with the at least one common transmission format accommodates a sum of payload and header bits of the group of users;
constructing means for constructing a multi-user packet utilizing one common transmission format, in response to determining that the highest priority user supports multi-user packets; and
constructing means for constructing a single-user packet for the highest priority user in response to determining that the highest priority user does not support multi-user packets.

18. The apparatus according to claim 11 further comprising a memory configured to store instructions for execution by the processor to thereby configure the processor.

19. The method according to claim 4, wherein selecting the multi-user media access control index includes selecting a media access control index with the shortest packet size when more than one more than media access control index are in common.

20. The apparatus according to claim 14, further comprising a memory configured to store instructions for execution by the processor to thereby configure the processor.

21. The apparatus according to claim 14, wherein the processor configured to select the multi-user media access control index includes being configured to select a media access control index with the shortest packet size when more than one more than media access control index are in common.

* * * * *